United States Patent [15] 3,659,281

Mori [45] Apr. 25, 1972

[54] LIGHT PEN TRACKING SYSTEM

[72] Inventor: Samio Mori, Tokyo, Japan

[73] Assignee: Nippon Electric Company, Limited, Minato-ku, Tokyo, Japan

[22] Filed: Jan. 18, 1971

[21] Appl. No.: 107,158

[30] Foreign Application Priority Data

Jan. 19, 1970 Japan....................................45/5844

[52] U.S. Cl. ...................................340/324 A, 250/217 CR
[51] Int. Cl..........................................................G08b 5/22
[58] Field of Search.........................340/324 A; 250/217 CR

[56] References Cited

UNITED STATES PATENTS

| | | | |
|---|---|---|---|
| 3,394,366 | 7/1968 | Dye | 340/324 A |
| 3,505,666 | 4/1970 | Thorpe | 340/324 A |
| 3,506,875 | 4/1970 | Watanabe et al. | 340/324 A X |
| 3,512,037 | 5/1970 | Eckert et al. | 340/324 A X |
| 3,551,896 | 12/1970 | Baskin et al. | 340/172.5 |
| 3,576,574 | 4/1971 | Baskin et al. | 340/324 A |

*Primary Examiner*—David L. Trafton
*Attorney*—Sandoe Hopgood & Calimafde

[57] ABSTRACT

A light pen tracking system in which the size of the tracking mark is varied depending on the range of vision as determined by the distance of the light sensitive tip of the light pen from the display surface.

5 Claims, 9 Drawing Figures

INVENTOR
Samio Mori
by
Sandoe, Hopgood & Calimafde
ATTORNEYS

INVENTOR
Samio Mori
by
Sandoe, Hopgood & Calimafde
ATTORNEYS

INVENTOR
Samio Mori
by
Sandoe, Hopgood & Calimafde
ATTORNEYS

LIGHT PEN TRACKING SYSTEM

This invention relates to a light pen tracking system used for supplying light pen tracking information to an electronic computer as graphic information in the plotting of data on the surface of a such as a cathode-ray tube display device by the use of a light pen.

A light pen, having the function of detecting a light pulse delivered from the display surface of a cathode ray tube, is used for drawing a graph or any arbitrary pattern on the display surface such as that utilized in a data processing system. In a conventional light pen tracking system, a mark is displayed on a cathode ray display surface so that the motion of the light pen may be followed or tracked.

In order to achieve highly accurate tracking, the aperture (i.e. the range of view) of the light pen as well as the mark size must be small. The mark size is usually fixed in order to meet the size of the aperture. Therefore, the tracking of the light pen takes place only when the small mark falls in the narrow range of vision of the light pen during the motion of the pen. This imposes a limitation on the light pen tracking speed because the display renewal speed is limited. As a result, it is very hard to handle the light pen as compared to the use of a regular pen, in drawing various patterns.

It is, therefore, an object of this invention to provide a light pen tracking system which facilicates the speeding up of the tracking operation to an extent such that the light may be handled on the display surface substantially in the manner of a regular pen used to print on a sheet of paper.

According to the invention, there is provided a light pen tracking system in which the size of the mark is varied depending on the range of vision as determined by the distance of the light sensitive tip of the light pen from the display surface. The tracking range and speed are thus remarkably increased, making the handling of the light pen easier and more natural without affecting the tracking accuracy.

The light pen tracking system of the invention is based on the fact that since the range of vision of the light pen is proportional to the distance of the light sensing tip of the light pen from the display surface, the mark size can be made variable depending on that distance withought impairing the tracking capability. The tracking area is enlarged and the tracking speed with the enlarged mark for the greater distance is increased, while ensuring high tracking accuracy with the contracted mark size for the smaller distance.

Now the features and advantages of this invention will be clearly understood from the following detailed description of a preferred embodiment of this invention taken in connection with the accompanying drawings, wherein.

Figure 1:
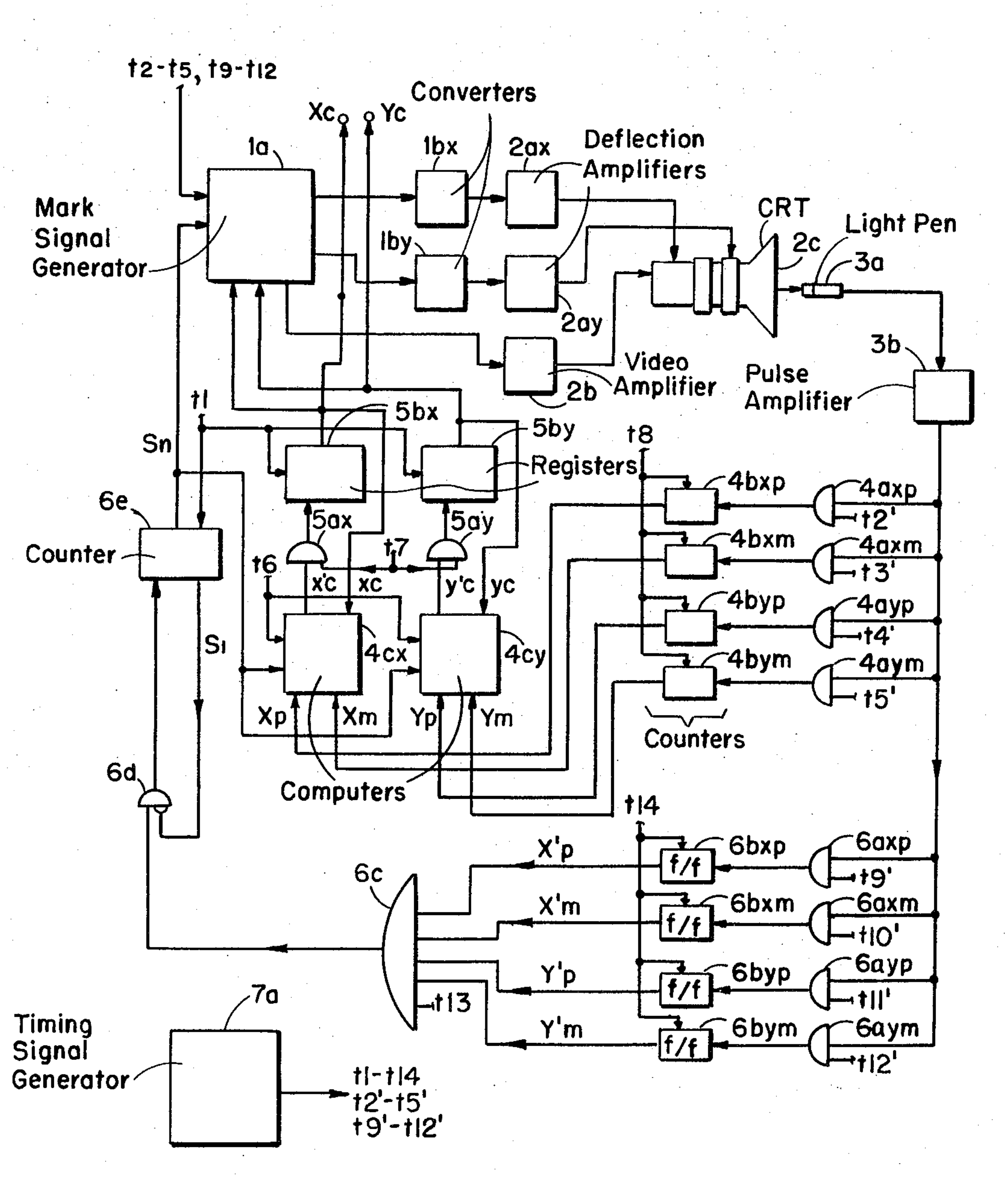
FIG. 1 is a block diagram of a light pen tracking system in accordance with this invention.
Figure 4:
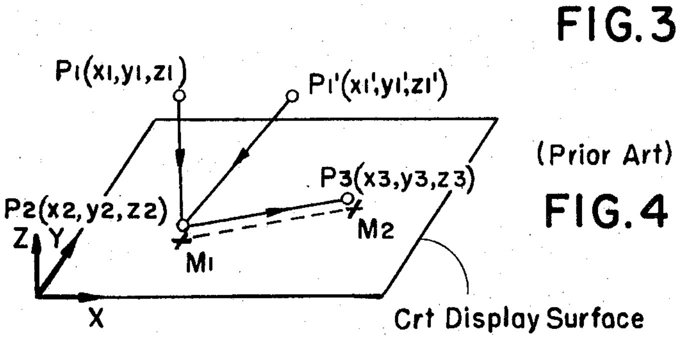
(Prior Art) FIG. 4
Figure 5:
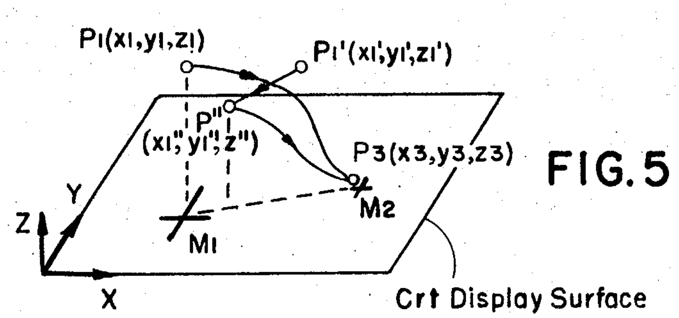
Figure 6:
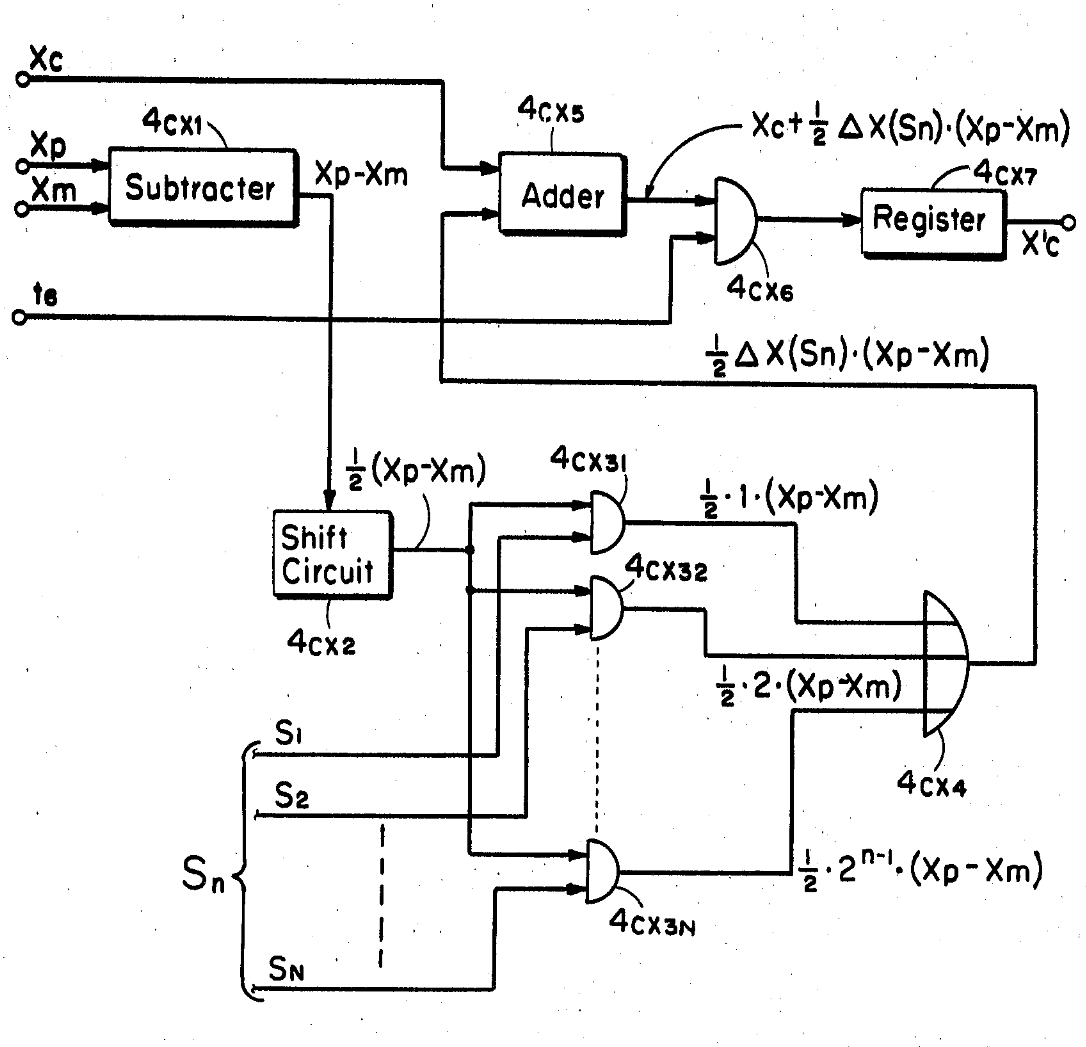

FIG. 4 schematically shows light pen tracking performed by a conventional light pen tracking system;

FIG. 5 schematically shows light pen tracking performed by the light pen tracking system shown in FIG. 1; and FIG. 6 is a block diagram of a center coordinate computing circuit of the embodiment shown in FIG. 1.

In the following description of the invention, the cathode ray tube display surface will be assumed to be an XY coordinate plane.

Referring to FIG. 1, the light pen tracking system according to this invention comprises a digital mark signal generator 1*a* of the type known in the art for generating a digital deflection coordinate signal and a video signal for displaying a mark. Digital-analogue (D-A) converters 1*bx* and 1*by* coupled to the output of generator 1*a* convert the digital deflection coordinate signal derived from the mark signal generator 1*a* into an analogue signal and deflection amplifiers 2*ax* and 2*ay* amplify the analogue deflection coordinate signal derived from the D-A converters 1*bx* and 1*by*, respectively. A video amplifier 2*b* also coupled to generator 1*a* amplifies the video signal derived from the mark signal generator 1*a*, and a cathode ray (CRT) 2*c* coupled to amplifiers 2*ax*, 2*ay* and 2*b* displays the mark according to the analogue deflection coordinate signal and video signal.

Figures 2, 3A, 3B, 3C, 3D:
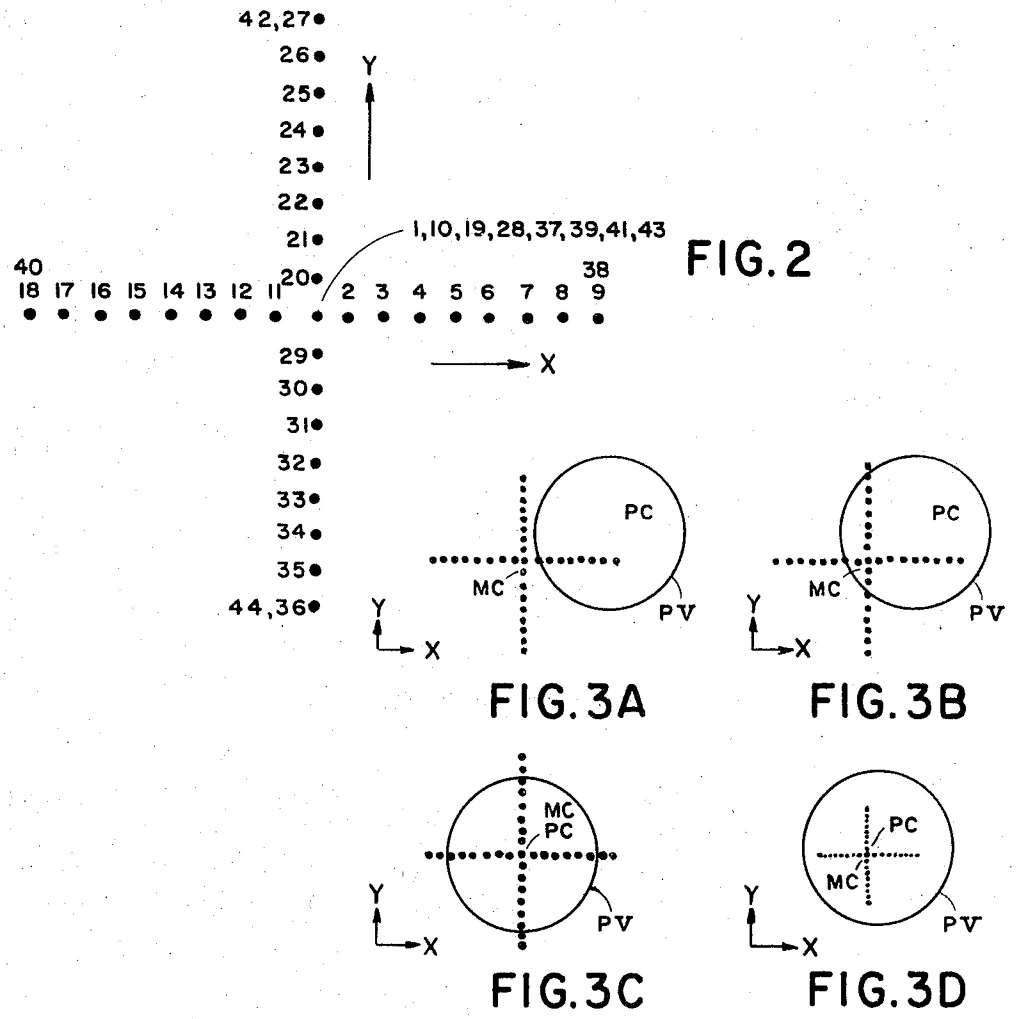
FIG. 2 shows a mark displayed on the surface of the cathode ray display tube.
FIGS. 3A through 3D are diagrams showing the relationship between the mark and the range of vision of a light pen.

The mark displayed on the display surface of the CRT 2*c* is shown in FIG. 2 in which the reference numerals 1 through 44 show the order in which the scanning is performed to form the marking.

The light pen tracking system further comprises a light pen 3*a* for detecting the light pulse from the mark displayed on the surface of the CRT 2*c*, and a pulse amplifier 3*b* for amplifying the signal detected by the light pen 3*a*. Only the mark light spots located on the display surface of CRT 2*c* within the range of vision of the light pen are picked up as a pulse train.

The operation of the individual circuit components of the system of FIG. 1 is now described under the control of the timing signals $t_1$ through $t_{14}$, $t_2'$ through $t_5'$, and $t_9'$ through $t_{12}'$ all of which are produced by a timing signal generator 7*a* in a manner that is well known in the art.

Center coordinate registers 5*bx* and 5*by* and a size selection counter 6*e* are reset by the timing signal $t_1$. The mark is displayed at time intervals of the timing signals $t_2$ through $t_5$ or $t_2'$ through $t_5'$. More specifically, the mark signal generator 1a begins its operation in response to the timing signal $t_2$, and the light spots 1 through 9 of the mark as shown in FIG. 2 are displayed centering certain definite coordinates during the interval of the timing signal $t_2'$. Similarly, the light spots 10 through 18 are displayed by the timing signal $t_3$ during the interval of the timing signal $t_3'$, the light spots 19 through 27 are displayed by the timing signal $t_4$ during the interval of the timing signal $t_4'$, and the light spots 28 through 36 are displayed by the timing signal $t_5$ during the interval of the timing signal $t_5'$, respectively. The pulse signals from the light pen are AND-gated with the timing signals $t_2'$ through $t_5'$, in AND gates 4*axp*, 4*axm*, 4*ayp* and 4*aym*, respectively. The output signals from the AND gates 4*axp*, 4*axm*, 4*ayp* and 4*aym* are supplied to pulse counters 4*bxp*, 4*bxm*, 4*byp* and 4*bym*, respectively. At the end of the timing signal $t_5'$, these counters store pulses to the number determined by the relationship between the mark and the range of vision of the light pen. For example, the pulse counter 4*bxp* stores to the number of $X_p$ corresponding to the number of the light spots among 1 light spots through 9 that fall within the range of vision of the light pen. Similarly, the pulse counters 4*bxm*, 4*byp* and 4*bym* store pulses to the numbers of $X_m$, $Y_p$ and $Y_m$, respectively which respectively correspond to the number of pulses in the corresponding series of light spots that fall within the range of vision of the light pen. Center coordinate computing circuits 4*cx* and 4*cy* (described more completely below with respect to FIG. 6) are then operated in response to the timing signal $t_6$, and new center coordinates ($X_c'$, $Y_c'$) are computed from the size designating signal Sn and the existing center coordinate signals ($X_c$) and ($Y_c$), using the following equations.

$$X_c' = X_c + ½\Delta X(Sn)\cdot(X_p - X_m) \quad (1)$$

$$Y_c' = Y_c + ½\Delta Y(Sn)\cdot(Y_p - Y_m) \quad (2)$$

where $\Delta X(Sn)$ and $\Delta Y(Sn)$ represent the inherent values of mark size Sn and are equal to the distances between the light spots on the X-axis and the Y-axis.

Referring now to FIG. 6, the center coordinate computing circuit 4*cx* comprises a subtracter 4*cxl* for producing signal $(X_p - X_m)$ from the signals $(X_p)$ and $(X_m)$; a one-figure shift circuit 4*cx*2 for producing signal $½(X_p - X_m)$ from the signal $(X_p - X_m)$; and $(n-1)$-figure shift circuits 4*cx*31, 4*cx*32 - - - 4*cx*3N. An arbitrary one Sn of the size designating signals S1, S2 - - - SN representing the existing mark size is supplied to the corresponding figure shift circuit 4*cx*4, in which the signal $½(X_p - X_m)$ is multiplied by $\Delta X(Sn)$, that is $2^{n-1}$ in this embodiment, so as to obtain an output signal $½\Delta X(Sn)\ (X_p - X_m)$ which is supplied to an adder 4*cx*5 via an OR gate 4*cx*4. In the adder 4*cx*5, the signal $½\Delta X(Sn)(X_p - X_m)$ is added to the existing center coordinate signal $(X_c)$ in order to obtain the new center coordinate signal $(X_c')$, that is $X_c + ½\Delta X(Sn)(X_p - X_m)$. The signal $(X_c')$ is supplied to a register 4*cx*7 via an AND gate $4cx6$ during the interval of the timing signal $t_6$. In the same manner, the new center coordinate signal ($Y_c'$) is obtained.

The center coordinate signals ($X_c'$) and ($Y_c'$) which have been obtained by the mark coordinate are sampled by the timing signal $t_7$ by AND gates 5*ax* and 5*ay* (FIG. 1) and are then stored in center coordinate registers 5*bx* and 5*by*, respectively. The resultant center coordinate signals ($X_c'$) and ($Y_c'$) are supplied to the mark signal generator 1*a*, and the new center position of the mark to be displayed is thus determined. This center position is used as coordinate data showing the track of the light pen.

Then, to be ready for the following state of this cycle operation, the pulse counters 4*bxp*, 4*bxm*, 4*byp* and 4*bym* are reset by the timing signal $t_8$. In order to check whether the mark size is proper or not, the mark center and the ends of the four directions of the mark are displayed in the time interval of the timing signals $t_9$ through $t_{12}$ or $t_9'$ through $t_{12}'$. Namely, the mark signal generator 1*a* starts operation in response to the timing signal $t_9$, and the light spots 37 and 38 are displayed during the timing signal $t_9'$. Similarly, the light spots 39 and 40 are displayed in response to the timing signal $t_{10}$ during the timing signal $t_{10}'$; the light spots 41 and 42 are displayed in response to the timing signal $t_{11}$ during the timing signal $t_{11}'$; and the light spots 43 and 44 are displayed in response to the timing signal $t_{12}$ during the timing signal $t_{12}'$; respectively. The pulse signals from the light pen are AND-gated by the timing signals $t_9'$ through $t_{12}'$ by the gate circuits 6*axp*, 6*axm*, 6*ayp* and 6*aym*, respectively. The output signals are supplied to trigger flip-flops 6*bxp*, 6*bxm*, 6*byp* and 6*bym*, respectively.

When the center of the mark is located in the range of vision of the light pen 3*a*, and the point 38 comes outside of the range of visicon or vice versa, the output signal $X_p'$ of the flip-flop 6*bxp* is logic "1," and when both the center and the point 38 of the mark are located in the range of vision, the output signal $X_p'$ is logic "0." The output signals $X_m'$, $Y_p'$ and $Y_m'$ are derived from the flip-flops 6*bxm*, 6*byp* and 6*bym* in the same manner, respectively. Therefore, only when the center of the mark is located in the range of vision with all the mark ends (the four points 38, 40, 42 and 44) falling without thereof as shown in FIG. 3C, an output signal of logic "1" is derived from an AND gate 6*c* at the time point of the timing signal $t_{13}$. Under this state, the following Boolean algebraic equation is satisfied:

$$X_p' \cdot X_m' \cdot Y_p' \cdot Y_m' = 1 \qquad (3)$$

At this time, the mark cannot be missed out of the range of vision of the light pen even if the mark size is reduced.

The center of the mark unfailingly falls inside of the range of vision as long as any one of the mark end points 38, 40, 42 and 44 is enclosed by the range of vision. In other cases, the output signal of the AND gate 6*c* is logic "0."

When the mark size is not minimum or, in other words, when the minimum size designating signal S1 is not supplied to an INHIBIT gate 6*d*, the logic "1" from the AND gate 6*c* is supplied to a size selecting counter 6*e* via the INHIBIT gate 6*d* and causes the counter 6*e* to start counting down to minimize the mark size, whereby a new size designating signal $S_{n-1}$ is produced. The signal $S_{n-1}$ is supplied to the mark signal generator 1a and to the center coordinate computing circuits 4*cx* and 4*cy*. When the mark size is at a minimum or, in other words, when the size designating signal SN is S1, the output signal of the AND gate 6*c* is inhibited by the size designating signal S1 supplied to the INHIBIT gate 6*d*.

To be ready for the next cycle operation, the trigger flip-flops 6*bxp*, 6*bxm*, 6*byp* and 6*bym* are reset by the timing signal $t_{14}$.

One cycle of operation of this invention is performed in the manner as described above. In short, the generation of the timing signal is repeated at time points $t_1$, $t_2$, $t_3$ - - - $t14$, $t_2$, $t_3$ - - - $t_{14}$, $t_2$, $t_3$, - - - $t_{14}$, because the timing signal $t_1$ is generated only when the center coordinate and mark size are to be reset. The center coordinate of the mark and the mark are modified in a manner to reduce its size, and the coordinate data, which indicates the track of the light pen, is thus determined.

Further details of the light pen tracking of the mark will be described by referring to FIGS. 3A through 3D wherein the reference MC denotes the center coordinate of the mark, PC denotes the center coordinate of the range of vision of the light pen, and PV denotes the boundary of the range of vision. In the relationship as shown in FIG. 3A, only the X coordinate is modified in the direction for coordinate MC to approach coordinate PC, as is evident from Equations (1) and (2). However, the size of the mark is not modified as in Equation (3).

In the relationship as shown in FIG. 3B, both the X and Y coordinates are modified in the direction for coordinate MC to approach coordinate PC. As a result, the Y coordinate is brought to perfect coincidence with that of coordinate PC. In this operation, the size of the mark is not modified. In the relationship as shown in FIG. 3C, the center coordinate is not modified since the coordinates MC and PC are coincident with each other. However, the size of the mark is made smaller. In the relationship as shown in FIG. 3D, neither the center coordinates nor the size of the mark is modified. When the light pen is moved or brought near the display surface, the relationship between the mark and the range of vision of the light pen becomes similar to that shown in FIGS. 3A, 3B or 3C. The operation as described above is then repeated.

The effects of the present invention will be described by referring to FIGS. 4 and 5 wherein the references M1 and M2 denote the center coordinates of the mark on the cathode ray display surface, and the references P1, P1', P1'', P2 and P3 denote the points directed by the light pen in the upper area on the display surface. It is assumed here that the mark is going to be moved from coordinate M1 to coordinate M2.

FIG. 4 shows an example of coordinate status on the display surface in a conventional system wherein the light pen is once moved from point P1 or P1' to point P2 located above center coordinate M1, and then carried to point P3 at a constant speed, and thence to center coordinate M2.

In contrast, according to the invention, as shown in FIG. 5, the light pen is moved, for example, from point P1 or P1'' at which the mark comes in the range of vision of the light pen, to point P3 directly, or from point P1' to P3 by way of point P1''. In this case, the mark size becomes small as the light pen is moved as shown in FIG. 5. When the mark is to be moved from coordinate M2 to the other point, the mark size on coordinate M2 is expanded and the above-mentioned operation is then applied.

As will be clear from the foregoing, the motion of the light pen can take a short cut, thereby increasing the tracking speed. It should be noted in this connection that the tracking accuracy is not impaired in spite of the increased speed because the mark size is varied depending on the light pen-display plane distance.

While one specific embodiment of the invention has been described above, it is to be noted that this description is made only by way of example and not as a limitation on the scope of the invention. It is apparent that various embodiments are conceivable to engineers in this technical field. For example, instead of using the cross mark as in the embodiment herein described, another mark may be used having eight radial arms arranged at intervals of 45°. In this case, the center coordinate can be modified in the 45° directions. Also, the order of displaying the light spots which constitute the mark may be modified by the use of a suitable mark coordinate computing circuit and mark size selector. Also, N kinds of mark sizes employed in the embodiment may be increased or decreased in succession according to the range of vision of the light pen. Also, the function of the mark coordinate computing circuit, mark size selector, etc. may be assigned to a computer with appropriate programming.

Thus while only a single embodiment of the invention has been herein specifically described, it will be apparent that modifications may be made therein all without departing from the spirit and scope of the invention.

What is claimed is:

1. A light pen tracking system comprising:

a mark generator for generating a signal representative of a mark to be displayed;

means for displaying said mark on one surface thereof in response to said signal;

a light pen responsive to said mark displayed on said one surface of said displaying means for producing signals in the form of pulses;

means coupled to said light pen for detecting the spatial deviation of the center coordinates of said mark with respect to the region of view of said light pen, said region depending on the distance of said light pen from said one surface;

means for moving the center coordinate of said mark on said one display surface so as to reduce said deviation; and means for varying the size of said mark depending on said range of vision.

2. The light pen tracking system as claimed in claim 1, in which said mark size varying means includes means for determining whether the center and end points of said mark are in the range of vision of said light pen.

3. The light pen tracking system as claimed in claim 2, in which said mark size varying means further comprises means coupled to said determining means for producing a logic signal of a first type when the center and end points of said mark are in the range of vision of said light pen, and a logic signal of a second type when the end points of said mark are beyond the range of vision of said light pen.

4. The light pen tracking system of claim 3, in which said mark size varying means further comprises means coupled to said mark generator responsive to a logic signal of one of said first and second types for producing a mark size select signal for said mark generator.

5. The light pen tracking system of claim 4, further comprising gating means interposed between said logic signal producing means and said mark size select producing means, and means responsive to a minimum mark size select signal for inhibiting said gating means.

* * * * *